US007210541B2

(12) United States Patent
Miller

(10) Patent No.: US 7,210,541 B2
(45) **Date of Patent: *May 1, 2007**

(54) TRANSDUCERIZED ROTARY TOOL

(75) Inventor: Jerry Miller, Traverse City, MI (US)

(73) Assignee: Microtorq LLC, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/315,952

(22) Filed: Dec. 22, 2005

(65) Prior Publication Data

US 2006/0096767 A1 May 11, 2006

Related U.S. Application Data

(63) Continuation-in-part of application No. 10/654,504, filed on Sep. 3, 2003, now Pat. No. 7,090,030.

(51) Int. Cl.
*B23Q 1/00* (2006.01)

(52) U.S. Cl. .......................... 173/2; 173/182; 173/217; 81/469

(58) Field of Classification Search ................ 173/178, 173/179, 180–183, 217; 81/467, 469
See application file for complete search history.

(56) References Cited

U.S. PATENT DOCUMENTS

| | | | |
|---|---|---|---|
| 4,487,270 A | 12/1984 | Huber | |
| 4,502,549 A | 3/1985 | Hornung et al. | |
| 4,518,298 A | 5/1985 | Yasukawa | |
| 4,571,696 A | 2/1986 | Bitzer | |
| 4,887,499 A | 12/1989 | Kipfelsberger | |
| 4,922,436 A | 5/1990 | Dohm et al. | |
| 5,115,701 A | 5/1992 | Lehnert | |
| 5,898,598 A | 4/1999 | Szwast et al. | |
| 5,898,599 A | 4/1999 | Massie et al. | |
| 6,405,158 B1 | 6/2002 | Massie et al. | |
| 6,424,799 B1 | 7/2002 | Gilmore | |
| 2004/0040727 A1 * | 3/2004 | Miller | 173/2 |

* cited by examiner

*Primary Examiner*—Thanh Truong
(74) *Attorney, Agent, or Firm*—Keith R. Derrington

(57) ABSTRACT

Disclosed herein is a variable speed tool useful for use with securing or removing industrial fasteners. The tool also includes a means to torque the fastener to a certain precise torque. The tool can be used with an associated controller that provides control commands to the tool.

22 Claims, 9 Drawing Sheets

TRANSDUCERIZED ROTARY TOOL

CROSS-REFERENCE TO RELATED APPLICATONS

This application is a CIP of U.S. application Ser. No. 10/654,504, filed on Sep. 3, 2003, now U.S. Pat. No. 7,090,030, and the full disclosure of which is hereby incorporated by reference herein.

BACKGROUND OF THE INVENTION

1. Field of the Invention

The invention relates generally to the field of automatic drivers for fasteners. More specifically, the present invention relates-to an apparatus for driving fasteners that is automatic and controllable. Yet more specifically, the present invention relates to a device for driving fasteners, where the apparatus delivers a specified torque. Yet even more specifically, the present invention relates to an automatic apparatus where the torque delivered is controllable from about 1 in-lb up to about 50 in-lb.

2. Description of Related Art

Many prior art devices exist that are capable of driving fasteners apertures, such as threaded bolt holes and the like. These tools typically require the user to activate a switch or a trigger to activate the device. Further, some prior art devices rely on power sources such as compressed air to drive the associated motor, which can limit the applicability of a device since producing compressed air requires space for a compressor and is generally impractical. Other devices that employ electrical motors produce an output whose speed and torque can vary and is not precisely controllable or not controllable at all. However many instances where it is required to employ a rotary tool, the ability to control the speed and torque is important. Some fasteners require that they be installed to a specified torque, and it is important that how much the fastener has been torqued be easily verified by the operator of the device.

Some of these devices include means to measure the rotational force, or torque, exerted by the particular device. These means range from monitoring the current consumed by the device, pressure sensors applied to working parts of the device, and included various sensors within the device. Examples of prior art devices useful for driving fasteners can be found in U.S. Pat. Nos. 4,487,270, 4,887,499, 6,424,799, 4,571,696, and 4,502,549.

Therefore, there exists a need for an apparatus and a method for securing fasteners that is reliable, accurate, and can precisely torque a fastener to a specified torque. An additional need exists for a tool to be durable, hand held, and provide an indication the preciseness of the directly torqued value.

BRIEF SUMMARY OF THE INVENTION

The present invention involves a rotary tool comprising a motor capable of providing a rotational force connected to a chuck assembly. Included with the present invention is a variable voltage device that is responsive to a magnetic field. The motor can be selectively controlled by operation of the variable voltage device—where the control includes on off switching as well as motor speed control. The tool of the present invention includes a push to start function, that is by urging the tool against the object being rotated, the rotary tool includes means to begin operation of the tool based on the urging force. The rotational velocity and/or amount of force delivered by the tool can vary based on the amount of forced applied during the urging. Optionally, the variable voltage device can be a Hall effect sensor, either linear or digital.

The present invention can further include a field device provided on the chuck assembly, where the field device is capable of emitting a magnetic field. Positioning the field device by selective movement of the chuck assembly controllably drives the motor. This is done since positioning the field device manipulates the magnitude of the magnetic field provided to the variable voltage device from the field device. The magnitude of the magnetic field proportionally relates to the proximity of the variable voltage device in relation to the field device.

The rotary tool of the present invention can further include a lever assembly having a field device formed thereon. The field device within the lever is also capable of emitting a magnetic field. Positioning the field device within the lever by selective movement of the lever assembly can controllably drive the motor. Positioning the field device manipulates the magnitude of the magnetic field applied to the variable voltage device from the field device within the lever. The magnitude of the magnetic field within the lever field device proportionally relates to how close the variable voltage device is in relation to the field device. Optionally, a handheld pistol grip assembly can be employed in lieu of the lever assembly.

Preferably included with the rotary tool of the present invention is a torque transducer capable of measuring the value of the torque generated by the chuck assembly. Optionally included with the transducer is at least one strain gauge in cooperative engagement with the torque transducer. The at least one strain gauge transmits data representing the torque generated by the chuck assembly. This data monitored by the strain gage is usable to terminate operation of the driver when the torque generated by the chuck assembly reaches a predetermined amount.

Also optionally included with the rotary tool of the present invention is at least one selector switch programmably capable of selectively reversing the polarity of the electrical power supplied to the driver. Additional selector switches can be included that are also programmable. The additional selector switches can be capable of selectively operating the driver in a different control mode.

Optionally, the present invention can comprise a system to drive fasteners comprising a rotary tool combinable with a controller assembly. Here the rotary tool includes a motor capable of providing a rotational force, a chuck assembly operatively connectable to the motor, and a variable voltage device responsive to a magnetic field. The motor is in operative communication with the variable voltage device. The controller assembly should be capable of providing control instructions to the rotary tool where the control instructions comprise maximum torque magnitude, speed, among other operational variables.

DETAILED DESCRIPTION OF THE INVENTION

The present invention considers a rotary tool system comprising a rotary tool combined with a controller system. With reference to the drawings herein, one embodiment of the rotary tool 10 of the present invention is shown in perspective view in FIG. 1A and an exploded view in FIG. 1B. The rotary tool 10 is capable of driving fasteners, such as bolts, nuts, screws, self-threading screws, etc. Further, the rotary tool 10 is capable of repeatably applying fasteners to a precise specifiable torque. In the embodiment of the invention as shown in FIG. 1B, a motor 36 is included with the invention capable of initiating a force used to torque the fasteners. Preferably the motor is a brushless DC motor operating at 48V to 60V. The motor 36 employs a stator (not shown), a rotor (not shown), and a commutation module (not shown). The stator is comprised of a series of windings that surround the rotor. Magnets (not shown) are secured to the outer radius of the rotor and current is applied to the windings situated just counterclockwise of the magnets. The current within the stator creates an electromagnetic field that repels the magnets causing rotation of the rotor. The commutation module is attached to the rotor and has an indicator from which the angular location of the magnets is determined. By tracking the location of the magnets, the series of windings just counterclockwise of the magnets, at any given point in time, are energized which perpetuates rotation of the rotor.

Figure 1A:
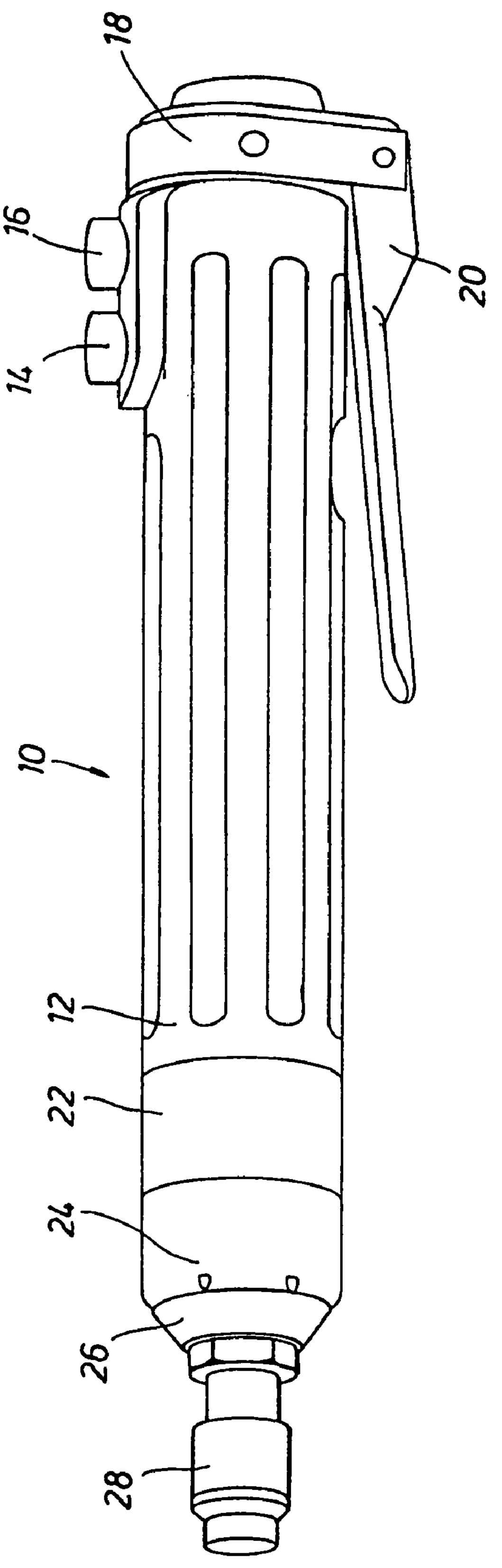
FIG. 1A depicts one embodiment of the present invention.
Figure 5:
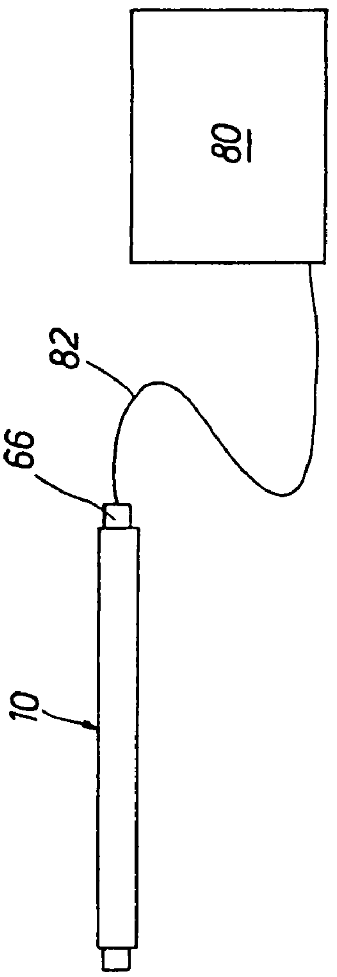
FIG. 5 presents an embodiment of the present invention combined with a controller.
Figure 2H:
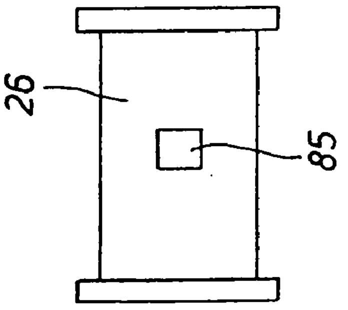
FIG. 2H illustrates a side view of a tranducerized element.
Figure 1B:
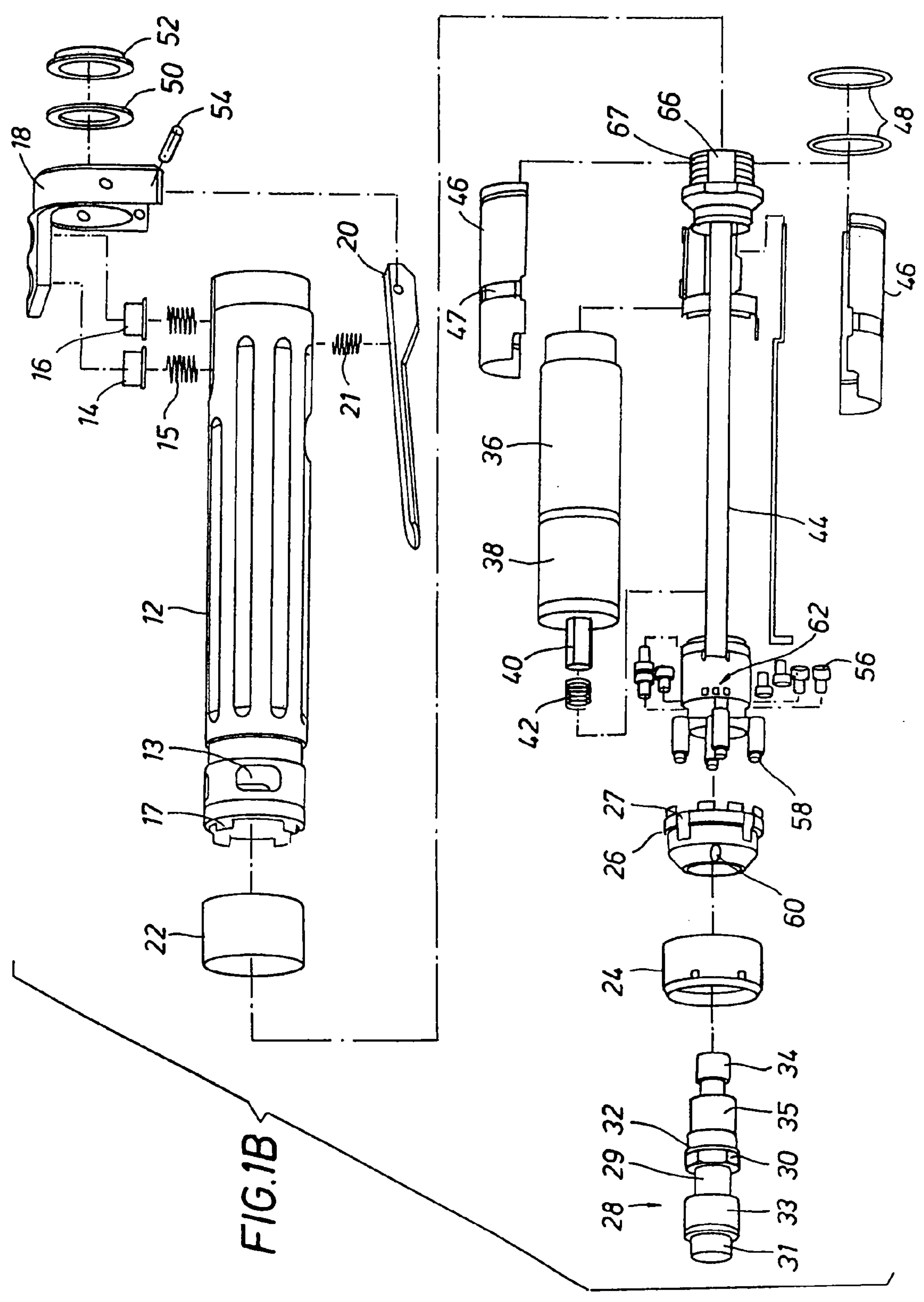
FIG. 1B illustrates an exploded view of one embodiment of the present invention.
Figure 2A:
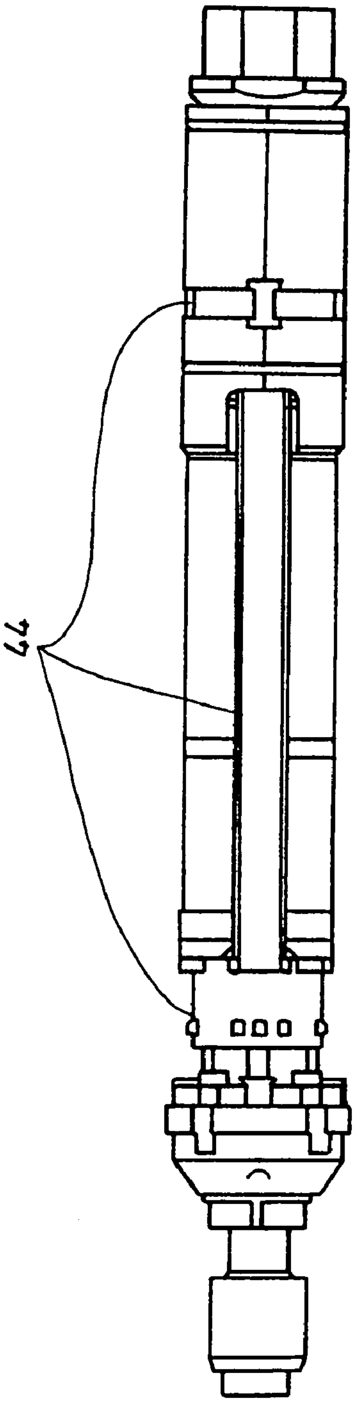
FIGS. 2A–2E provide a partial cut-away version of embodiments of the present invention.
Figure 2B:
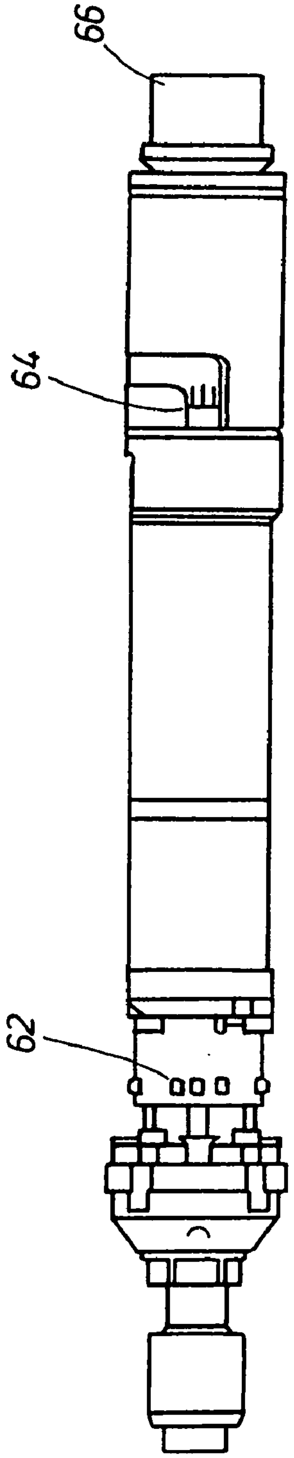
Figure 2C:
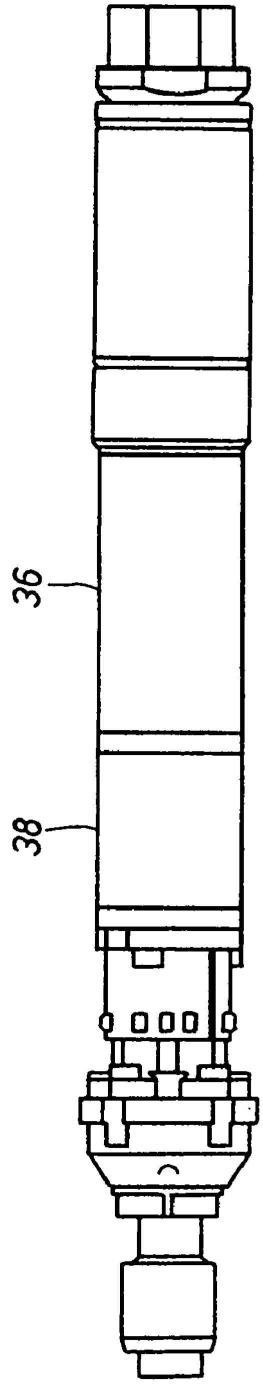
Figure 2D:
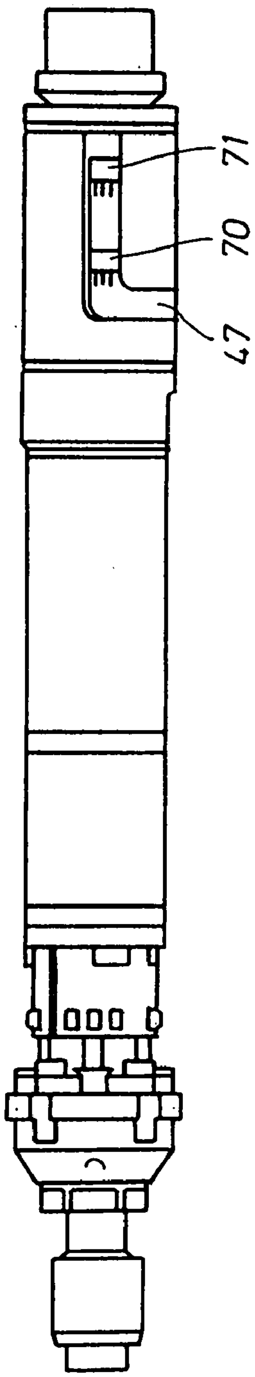
Figure 2G:
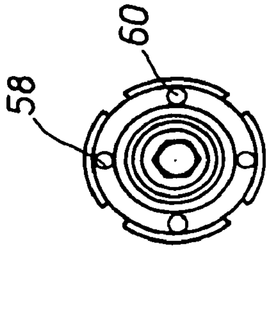
FIG. 2G illustrates a frontal view of an embodiment of the present invention.
Figure 2E:
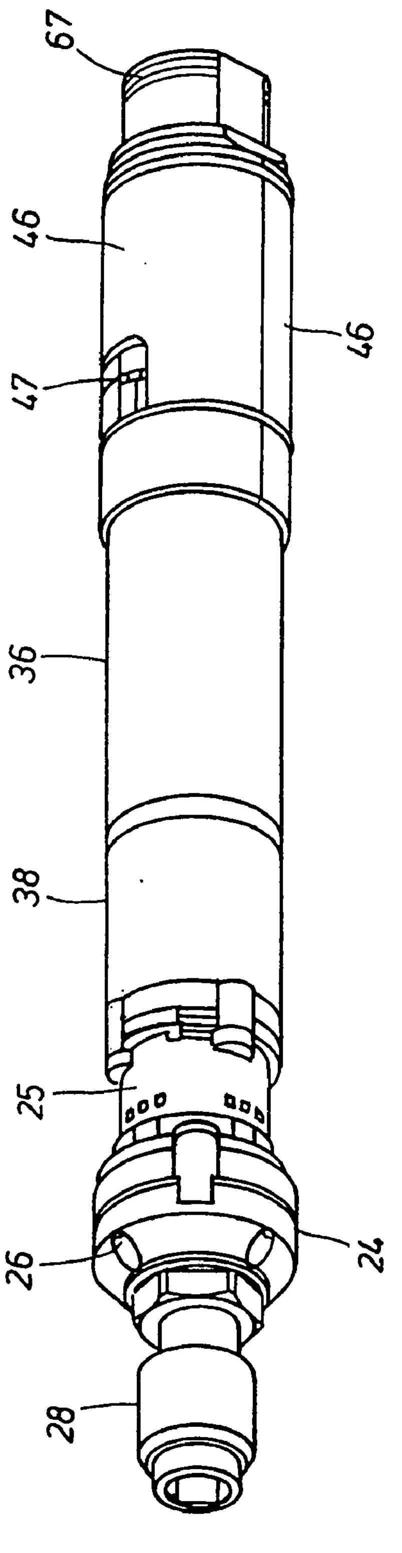
Figure 2F:
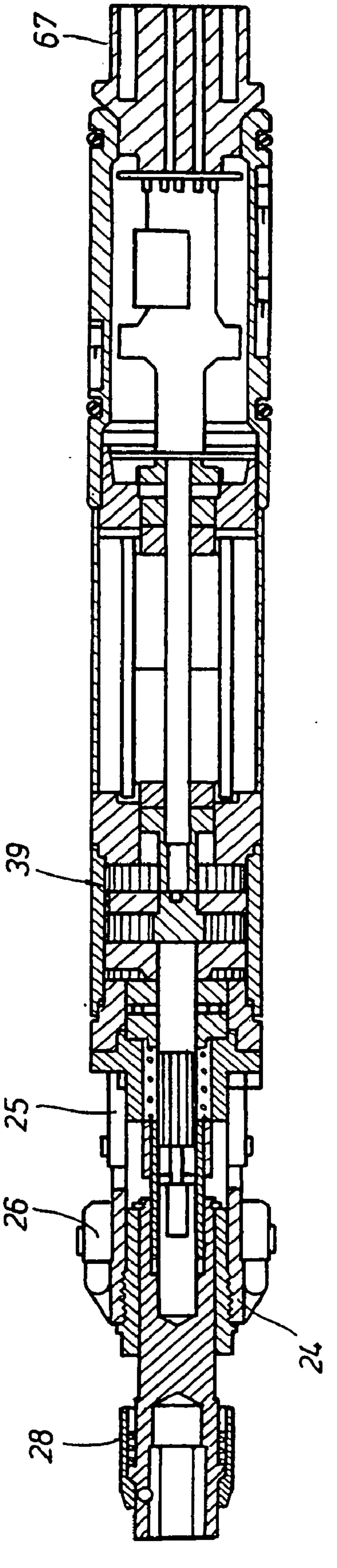
FIG. 2F provides a cutaway view of an embodiment of the present invention.

In the embodiment of FIGS. 1A and 1B a gear box 38 is shown disposed adjacent the motor 36 is operative connected to the motor 36. The gear box 38 contains a series of gears 39 configured into a gear train or system in mechanical cooperation with the motor 36. The gears 39 are arranged to receive the output rotational force delivered by the motor 36 and convert that force into a specified torque at the output shaft 40 connected to the gear box 38. Preferably the gear train is comprised of at least two gear stages, where each stage converts the rotational torque and speed produced by the motor 36. It is also preferred that the gear box 38 function to increase the torque delivered by the motor 36 with a corresponding decrease in the rotation speed of the motor 36. The preferred range of torque to be output at the gear box 38 ranges from about 1 in-lb to about 50 in-lb.

Figure 6:
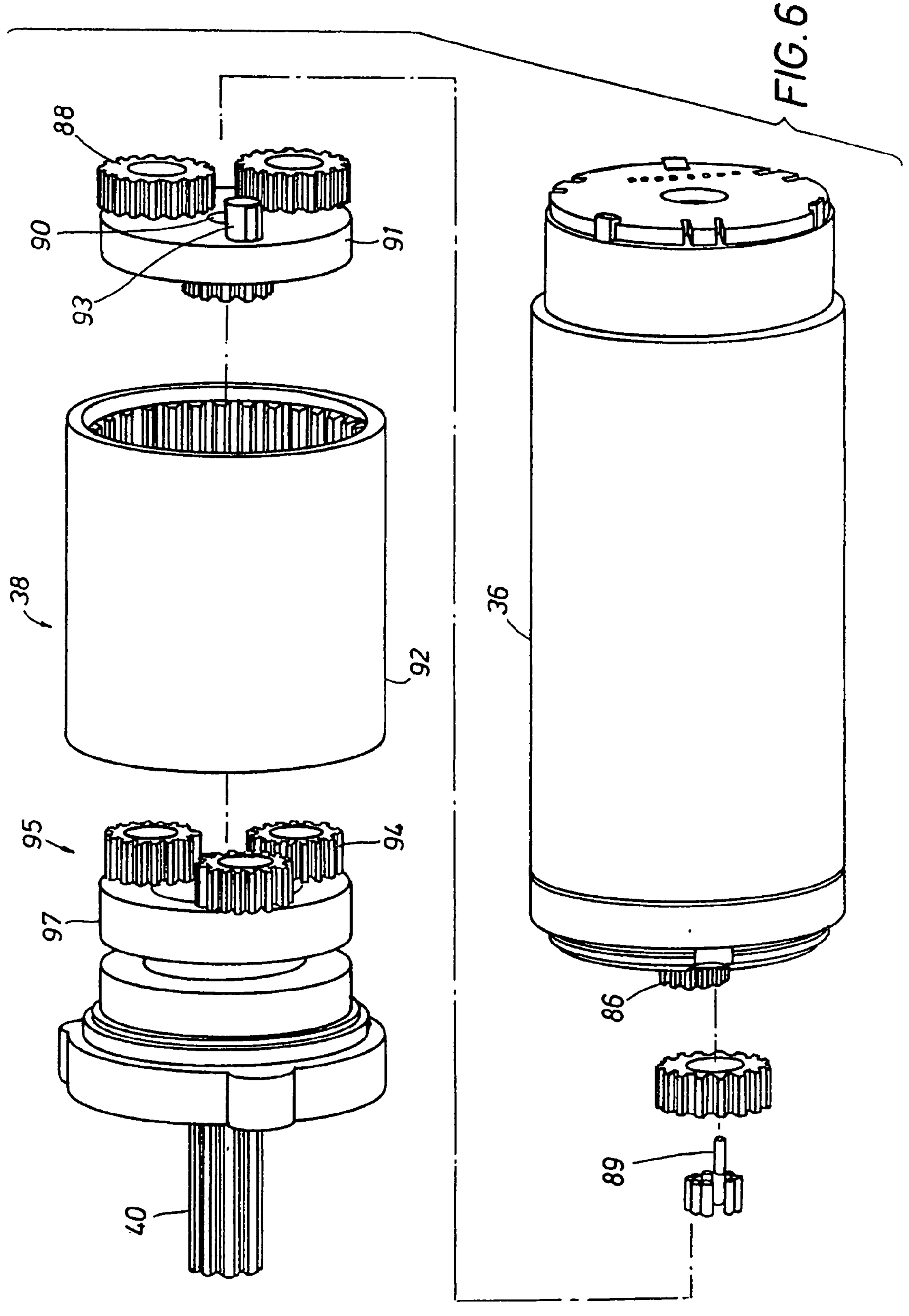
FIG. 6 provides an exploded view of a gear box in combination with a motor.
Figure 7A:
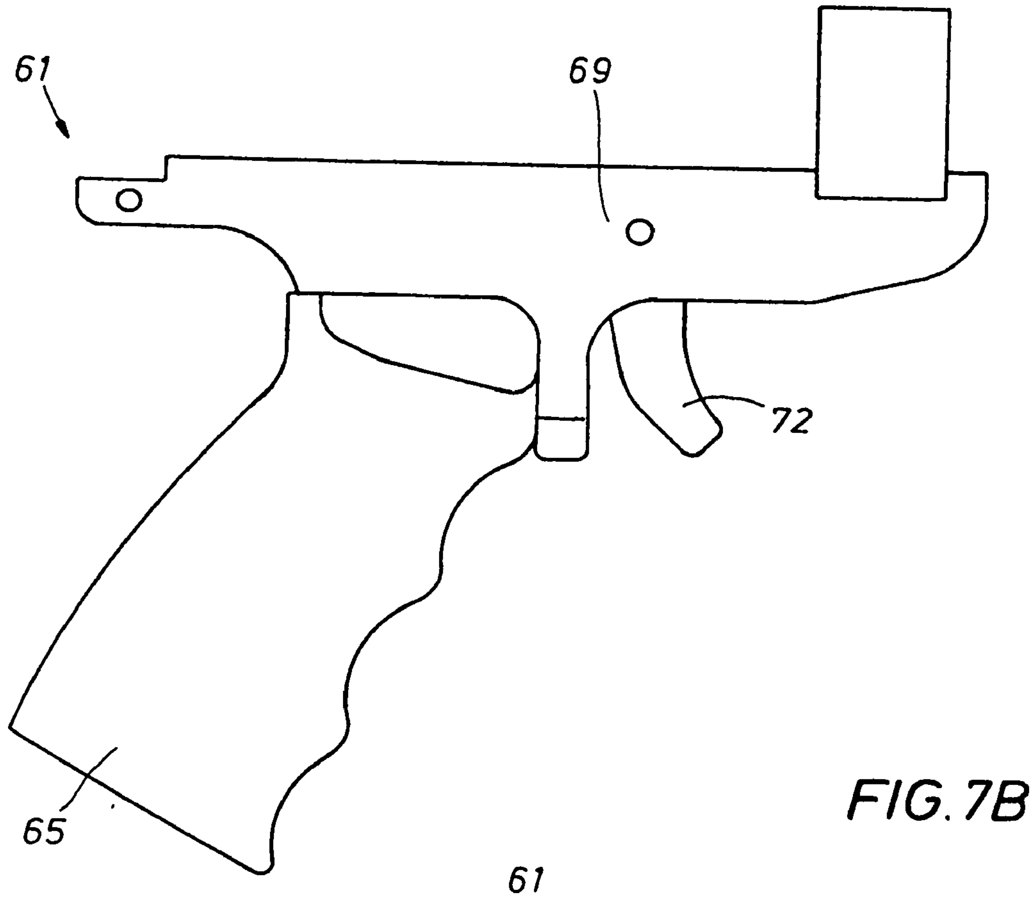
FIGS. 7A and 7B provide side and perspective views of embodiments of a tool grip.
Figure 7B:
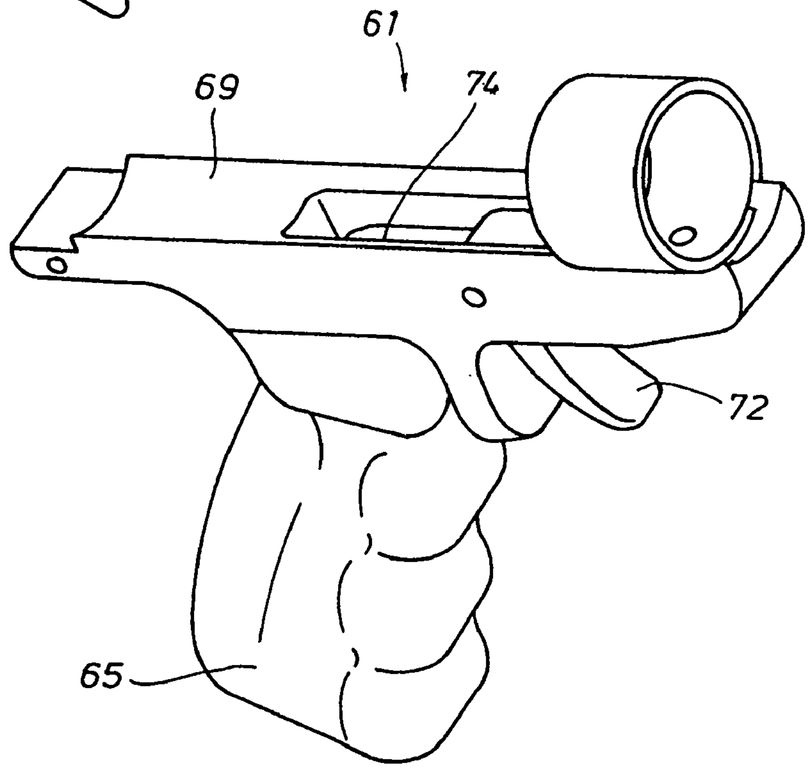

To maximize torque/velocity conversion while minimizing space, the preferred gear system is a planetary gear system comprising sun and planet gears. FIG. 6 provides an embodiment of a motor 36 combined with a gear box 38, where the gear box 38 is shown in an exploded view. In this preferred system the first stage sun gear 86 is attached to the motor 36 and engages a series of preferably three planetary gears 88. The planetary gears 88 are all attached to a planet carrier 91, from which extends a second sun gear 93 into a second planetary gear stage 95. The output shaft of the second gear stage is the output shaft 40. Preferably the gearbox 38 is sealed, this eliminates gear maintenance and protects the gears from foreign matter such as dirt. It is also preferred that the lubricant used exhibit high-pressure lubricity, and low viscosity in order to minimize the amount of lubricant used, which in turn reduces viscous shear.

Needle rollers 89 can be included between the annulus between the inner diameter of each planet gear (of each stage) and the outer diameter of the spindle 93 it rides on. The use of needle rollers 89 in this location of the gearbox 38 significantly reduces friction and wear. The needle rollers 89 also hold lubrication very well. The quantity of needle rollers 89 for use with each gear depends on the size of the individual gear and the gear box, it is believed that determining this quantity is within the scope of those skilled in the art.

To minimize contact between gear stages an axle bearing 90 is disposed into a conical cavity between the planets on the centerline of each planet carrier (91 and 97). When the mating sun gear (86 and 93) from the previous stage (or the motor 36) is inserted between the planet gear (88 and 94), its face comes to rest against the axle bearing 90. Preferably the axle bearing is comprised of a hardened metal ball. This ball could be made from any number of hardenable materials. This configuration produces very little friction since the axle bearing 90 and the sun gears (86 and 93) are in tangential contact. When these two stages are rotating with respect to each other, the material surface velocities at the point of contact is very low and can generate almost no moment arm. The conventional way of doing this is to place thin thrust washers between stages at the full diameter of the planet carrier. This is very inefficient considering the large contact area and surface speeds.

In order to adequately handle axial and radial loads on the output shaft 40 of the gearbox 38 as well as limit axial and radial play, a combination of two bearings is used. The bearing on the outboard most end of the gearbox is a conventional radial bearing. This bearing is meant to carry any side loads placed on the output shaft 40 as well as a small amount of axial load. The inboard bearing is an angular contact bearing. This bearings primary function is to carry the axial loads, which are transmitted down the output shaft as well as a small amount of radial load. The load coupling of these two bearings is accomplished by a small spacer of a precisely held thickness, which is sandwiched between the inner races of both bearings. These bearings, in combination, produce a very free spinning, durable and accurate mechanism. Optimal performance was obtained by gluing the axle bearing 90 in place with a cyanoacrylate glue in addition to other tolerance adjustments.

Enhanced performance and efficiency has been realized by some of the design improvements to the gear box 38, for example, the splined output shaft 40 was strengthened to carry more torsional load. The gearbox output shaft retainer ring (not shown) was improved to carry more axial load without breaking free. Heat treatment was added to surfaces on the planet carriers that come into contact with rotating planet gears. High-carbon steel alloy axles were included with the planet carriers to improve fatigue properties also the thickness of rear gearbox end cap was adjusted to minimize axial gear clearances.

Optionally the rotary tool 10 can be tranducerized to provide a real-time monitoring of the magnitude of the torque exerted onto a fastener by the rotary tool 10. Preferably the torque monitoring system include a flexure 25 secured to the gear box 38 on the end of the gear box 38 opposite to where it is connected to the motor 36. At least one strain gauge 85 can be included within the flexure 25 that senses the torque supplied by the motor 36 and transmits that sensed torque information to the tool controller 80. Preferably four strain gages 85 are included with the flexure 25. The flexure 25 is connected on its other end to the nose cap 26. As can be seen in FIG. 1, the nose cap 26 includes slots 27 on its outer surface that mate with tabs 17 formed on the front end of the body 12 of the rotary tool 10. As the motor 36 supplies torque to the fastener, the motor 36 in turn transmits an identical torque value to nose cap 26. Since the present invention mounts the motor 36 to the flexure 25, the flexure 25 experiences the torque supplied by the motor 36. Thus by positioning a at least one strain gage 85 on the flexure 25, the torque output of the motor 36 can be measured by the at least one strain gage 85. As the tool communicates with a tool controller 80, the torque output of the at least one strain gage 85 connects to the tool controller 80 as well. When the output torque of the motor 36 reaches a pre-selected torque, the tool controller 80 is programmable to immediately deactivate power to the rotary tool 10, thus ensuring that the fastener being secured by the rotary tool 10 is not over tightened.

The at least one strain gage 85 is calibrated as an assembly using what is know as a dead weight calibrator. Weights, which are certified and traceable to NIHST, are used to generate a static moment by placing them on an arm at a specific distance. The calibration does not occur until the at least one strain gage 85 is combined within the rotary tool 10. This is done in order to take into account frictional losses in the tool. Preferably, the at least one strain gage 85 can be a standard encapsulated strain gage that is modulus compensated for use on aluminum flexures. The signal produced by the detection of strain in the at least one strain gage 85 is carried to the controller 80 analog via the flex circuit 44 and the tool cable 82. The flex circuit 33 attaches directly to the flex circuit therefore eliminating wiring in the rotary tool 10. When the preferable configuration of four strain gages 85 is used, the four strain gages are attached to each other in a wheatstone bridge configuration using fine polyester varnished wire. The four dual element strain gages 85 are located 90° from each other on the flexure 26. The use of four strain gages 85 is employed in order to minimize bending cross talk and improve accuracy.

A chuck assembly 28 is provided with the embodiment of the present invention of FIGS. 1A and 1B. The chuck assembly 28 is connectable to the output shaft 40, preferably through corresponding spline grooves formed on the outer surface of the shaft 40 and an aperture (not shown) formed axially within the shaft 29 of the chuck assembly 28. As will be explained in further detail below, the length of the aperture should be long enough to allow the shaft 29 to slide back and forth along a portion of the length of the output shaft 40. A socket 31 is provided on one end of the chuck assembly 28, the socket 31 shown is suitable for receiving a fitting (not shown) specifically sized to fit the particular fastener being driven by the rotary tool 10. Further, a sleeve 33 is provided that when tugged axially retracts a retaining ball within the socket 31 thereby enabling adding or removing the particular fitting for use with the rotary tool 10. Also disposed on the chuck assembly 28 is a collar 35 slidable along the shaft 29. The collar 35 includes threads 32 on the outer surface adjacent the nut 30 formed to fit threads (not shown) in the nose cap 26. A ring magnet 34 is disposed on the end of the shaft 29 opposite the socket 31. A snap ring (not shown) is included on the shaft 29 that retains the collar 35 on the shaft between the sleeve 33 and the snap ring. Thus while the collar 35 remains on the shaft 29, it must be free to slide along the shaft 29 between the sleeve 33 and the snap ring. Accordingly when the chuck assembly 28 is screwed to the nose cap 26, the shaft 29 can be slideably disposed in and out of the collar 35 a certain distance while still being retained within the chuck assembly 28.

It should be pointed out that the rotary tool of the present disclosure is useful not only for driving and securing fasteners, but can also be useful as a drill motor, a sander, a buffer, a saw, and any other application where a rotary driving force is used. Moreover, the novel application of the push to start feature disclosed herein is applicable with all functions for which the present device can be used.

Optionally, illumination light emitting diodes (LEDS) 58 can be disposed on the forward end of the rotary tool 10. Preferably four illumination LEDS 58 can be included that reside in ports 60 formed on the nose cap 26. The illumination LEDS 58 should emit white light to provide illumination for the operator so the rotary tool 10 can be used in dark spaces. Also optionally provided are indicator LEDs 62 of various colors. Illumination of an indicator LED 62 of a certain color can provide operational information pertinent to the rotary tool 10. For example, one of the indicator LEDS 62 can be designed to emit a green light when it has been determined that a fastener has been torqued to a correct torque value. Similarly, if too much torque has been applied to a fastener a red indicator LED 62 can be activated and if too little torque has been applied a yellow indicator LED 62 can be lit. The colors of the illumination LEDS 62 is merely illustrative and not meant to constrict the scope of the invention as any color light can be chosen to represent a particular torque condition.

Referring now to FIGS. 3 and 4, other electrical circuitry that can be included with the present invention include variable voltage devices (VVD) such as a Hall effect sensor. As is well known, the output voltage of the VVD depends on the magnetic flux density applied to the VVD. Thus, the output voltage of a VVD can be increased by subjecting the VVD to a magnetic field. Likewise, the output voltage of the VVD can be eliminated by removing the magnetic field. Accordingly a switching mechanism can be produced by combining a field device that produces a magnetic field, such as a magnet, with a VVD. A simple application of this phenomenon involves creating a voltage source by positioning a magnet (either permanent or electro) close to a Hall effect sensor. With regard to the present invention, the preferred field device is a permanent magnet, and the preferred VVD is a Hall effect sensor.

Figure 3A:
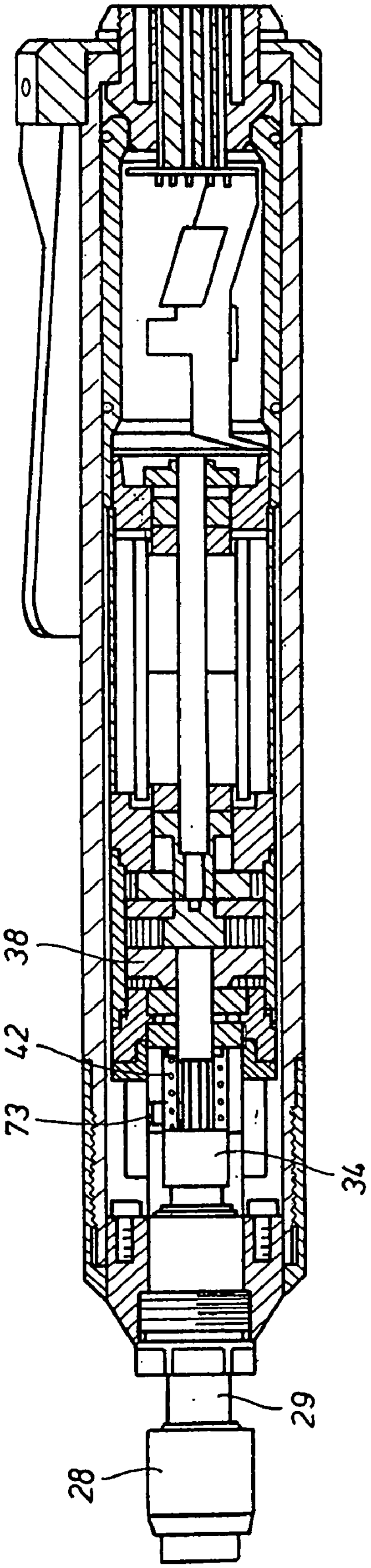
FIGS. 3A and 3B depict a cutaway view of an embodiment of the present invention.
Figure 3B:
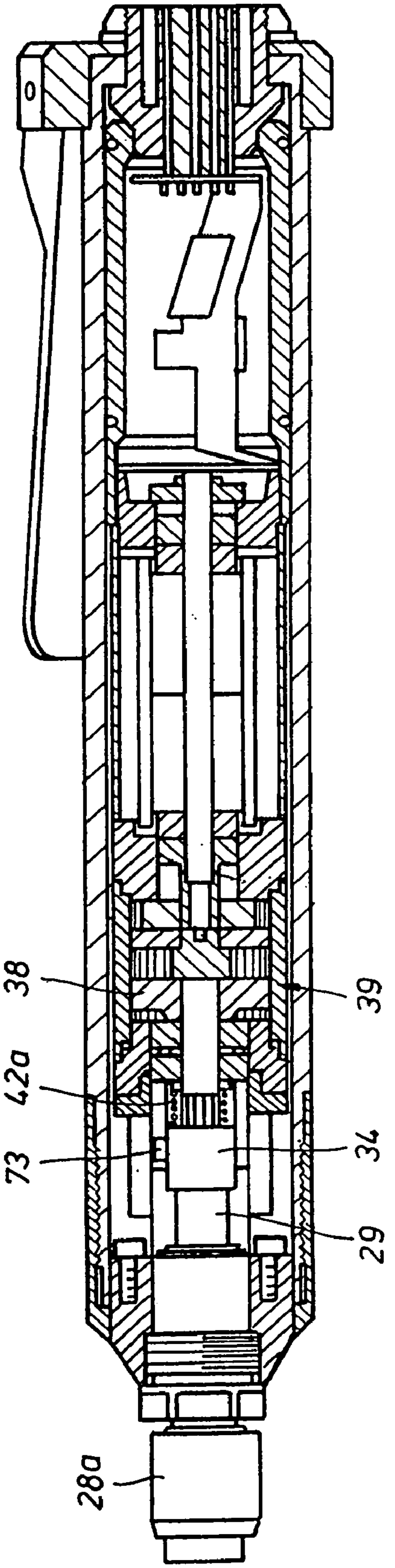

In FIGS. 3A and 3B one example of such a switching device can be seen. As can be seen from FIG. 3A, the chuck assembly VVD 73 is disposed on the flexure 25. As previously pointed out, the shaft 29 is slideable within the collar 35 and is thus axially moveable with respect to the rest of the rotary tool 10. Absent a force urging the shaft 29 inward toward the rotary tool 10, it is pushed outward by a spring 42 and is in its extended position as seen in FIG. 3A. When the shaft 29 is in the extended position, the magnetic field emitted by the field device 34 has little or no effect on the chuck assembly VVD 73 and the chuck assembly VVD 73 will emit no voltage. In contrast, when the shaft 29 is pushed inward into a retracted position, the field device 34 should be sufficiently proximate to the chuck assembly VVD 73 that it will emit voltage. It is preferred that when the shaft 29 is fully retracted that the interaction between the field device 34 and the chuck assembly VVD 73 be such that the chuck assembly VVD 73 emit its maximum voltage. The voltage emitted from the chuck assembly VVD 73 should be used to drive the motor 36. Therefore, the motor 36 can be activated or deactivated by retracting and extending the shaft 29. It should also be pointed out that like all VVDS the chuck assembly VVD 73 will begin to emit a higher voltage in response to an increase in the strength of the magnetic field applied to it by the field device 34. Thus the closer the field device 34 is to the chuck assembly VVD 73, the more voltage the chuck assembly VVD 73 will emit, and in turn the faster the motor 36 will operate. Accordingly, one of the many advantages of the present invention is the ability to initiate operation of the motor 36 by slowly retracting the shaft 29, and to operate the motor 36 at variable speeds depending on how far inward the shaft 29 is retracted. This introduces a novel approach to the operation of such devices.

Figure 4A:
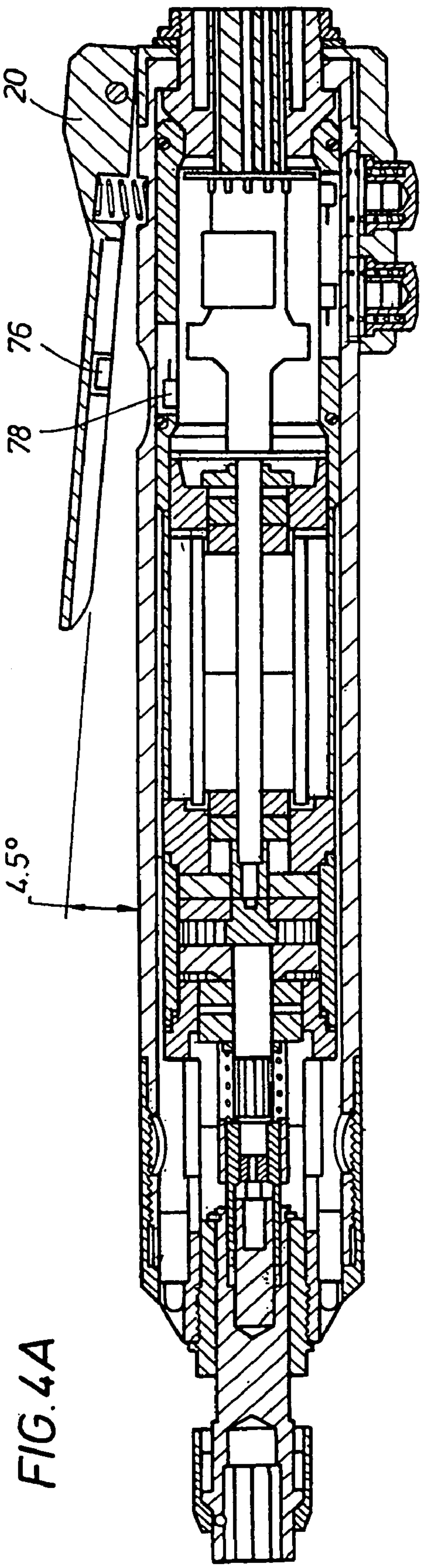
FIGS. 4A and 4B depict a cutaway view of an embodiment of the present invention.
Figure 4B:
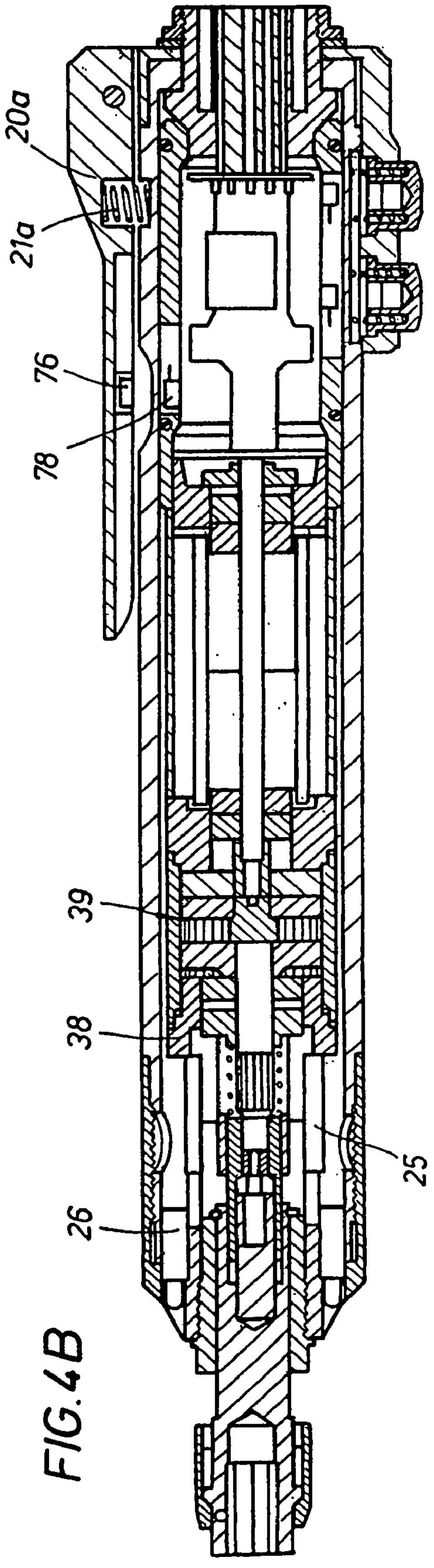

Alternatively, the motor 36 of the rotary tool 10 can be variably driven by manipulation of the lever 20. Referring now to FIGS. 4A and 4B, an alternative embodiment of the invention is disclosed. Here a lever field device 76, preferably a permanent magnet, is disposed within the body of the lever 20. The lever 20 is hingedly attached to the rotary tool 10 on one of its ends via pins 54 inserted into ports of the end cap 18. A corresponding lever VVD 78 is preferably positioned within a groove 47 formed on the outer surface of a wiring shell 46. Similar to the chuck assembly 28, a spring 21 is included to urge the free end of the lever 20 outward away from the body of the rotary tool 10. When an external force is applied to the lever 21, such as by an operator, urging the lever 21 toward the body of the rotary tool 10, the lever field device 76 should begin to approach the proximity of the lever VVD 78. Also similar to the operation of the chuck assembly VVD 73, the lever VVD 78 will begin to emit voltage to the motor 36 as the lever field device 76 approaches it. Thus the motor 36 can be manipulated by depressing the lever 21 in much the same manner as it is manipulated by retracting the shaft 29. Optionally, the lever 21 can be replaced by a pistol grip assembly 61, where the pistol grip assembly 61 comprises a handle 65, a base 69, and trigger 72. The handle 65 provides a grip for the users hand. The base 69 is secured to the handle 65 and securable to the body 12 of the rotary tool 10. The trigger 72 can be hingedly attached to the base 69 and include a trigger field device 74 disposed thereon such that when the trigger 72 is depressed the trigger field device 74 is moved towards the body 12. The pistol grip assembly 61 should be secured to the body 12 such that the trigger field device 74 will be proximate to the lever VVD 78 when the trigger 72 is depressed. Thus the rotary tool 10 can be actuated by depressing the trigger 72.

Two or more selector buttons (14 and 16) can optionally be provided with the present invention to enhance the flexibility of the rotary tool 10 functions. Each selector button (14 and 16) can contain a field device, such as a permanent magnet within. When assembled, the selector buttons (14 and 16) should be aligned with selector button VVDS (70 and 71) disposed within the groove 47. Springs 15 should be included with each selector button (14 and 16) to urge the buttons outward from the body 12 of the rotary tool 10 absent a force pushing the buttons inward. By programming the associated controller 80, actuation of the selector buttons (14 and 16) inward can vary the function of the rotary tool 10. For example, the controller 80 can be programmed such that inwardly pressing the first selector button 14 will toggle the polarity of the voltage delivered to the motor 36 thereby reversing the rotational direction of the chuck assembly 28. Additional options include the requirement that the buttons (14 and 16) be depressed twice, similar to the operation of a mouse of a personal computer, before the requested function occur. The selector buttons (14 and 16) can be programmed to initiate or control any number of external devices or process either directly or indirectly related to the operation of the tool. More commonly the selector buttons (14 and 16) can be used to control the direction of rotation of the tool as well as changing preprogrammed tool set points or parameter sets. It is believed that the programming of the associated controller 80 can be accomplished by those skilled in the art without undue experimentation.

While standard wiring or circuit boards could be used, it is preferred that the circuitry of the rotary tool be included on a flex circuit 44. The flex circuit 33 can provide a way to conduct power to drive the motor 36 and provide wiring to conduct control commands as well. As is well known, the flex circuit 44 can be comprised of a flexible resin like material, as such the flex circuit 44 can be tailored to fit within the present invention while consuming a minimum amount of space within the rotary tool 10. Further, the illumination LEDS 58, the indication LEDS 62, and lever and selector button VVDS (70, 71, and 78) can be situated directly on the flex circuit 44. Design of an appropriate flex circuit 44 for use with the present invention is well within the capabilities of those skilled in the art.

A memory chip should be included with the rotary tool 10 preferably included with the flex circuit 44. During final assembly and calibration of the tool, the memory chip is programmed at least with identification, calibration, and operating conditions desired by the rotary tool 10. The information can include the model number of the specific rotary tool 10, serial number, date of manufacture, date of calibration, maximum speed and maximum torque that the rotary tool 10 can attain, the calibration value, the motor angle counter per tool output revolution (this describes the gear ratio), and other useful operating parameters. Operation of the system requires constant real-time communication with a tool controller 80. Programmed within the tool controller 80 are the operating parameters for the specific rotary tool 10 being used. During use the tool controller 80 interrogates the memory chip within the specific rotary tool 10 to ensure that the specific tool is capable of performing the intended task. If the tool is capable of performing the task at hand, the controller will allow the specific rotary tool 10 to be operated; otherwise the controller 80 will not activate the tool. This interrogation happens upon power up or when the specific rotary tool 10 is first connected to the controller 80. The controller can be programmed with a lap top computer using a graphic user interface under the Windows operating system.

Once the rotary tool 10 has been assembled, including the addition of the programmed memory chip, the rotary tool 10 can be connected to the controller 80 via a cable 82 and the interrogation step is initiated. As noted above, as soon as the controller 80 determines that the rotary tool 10 is adequate to carry out the programmed function it can then provide power to the rotary tool 10. Upon being powered up, the rotary tool 10 is ready for use. As is well known, the rotary tool 10 is used by inserting a fitting into the socket 31, then coupling the fitting with the fastener that is to be driven. The rotary tool 10 can be activated in either a push to start mode, or by depressing the lever 20.

Activation by the push to start mode includes the step of first inserting the fastener where it is to be fastened. For example, if the fastener is a threaded screw, in the push to start mode the screw will be inserted into the hole (threaded or unthreaded) where it is to be secured. Then a force can be applied by the operator to the rear end of the rotary tool 10 that in turn pinches the screw between the fitting and the hole. As long as this force applied by the operator exceeds the spring constant of the spring 42, the shaft 29 will be retracted within the collar 35. As previously noted when the shaft is retracted within the collar 36, the field device 34 is located proximate to the chuck assembly VVD 73—as is illustrated in FIG. 3B. As previously noted, when the field device 34 approaches the chuck assembly VVD 73, voltage is emitted from the chuck assembly VVD 73 that in turn begins to drive the motor 36. Driving the motor 36 produces rotation of the chuck assembly 28 via the gear box 38 and output shaft 42. Rotation of the chuck assembly 28 can be used to drive the fastener into securing engagement with the associated hole by the transfer of rotational force from the chuck assembly 28 to the fastener.

Alternatively, the rotary tool 10 can be operated by depressing the lever 20 up against the body 12 of the rotary tool 10. In the embodiment of the invention in FIGS. 4A and 4B a lever field device 76 is shown disposed within the lever 20. As the lever 20 is depressed towards the body, the lever field device 76 approaches the lever VVD 78. In the same manner as the push to start mode, the lever VVD 78 begins to emit a voltage whose magnitude is in relation to the strength of the magnetic field applied to it by the lever field device 76. The voltage emitted by the lever VVD 78 can then be applied to driver the motor 36 where the magnitude of the voltage emitted by the lever VVD 78 directly corresponds to the rotational speed of the motor 36.

The push to start and throttle lever can either be used individually or in combination with each other. There are however instances where they are useful in combination. One can be used as an interlock for the other. It can be configured so that the throttle lever has to be fully depressed before the push to start can be activated. This configuration prevents operation of the tool before the operator has a good grip on it. Conversely it can be configured so that the push to start has to be fully depressed before the throttle can be activated. This configuration prevents the rotation of the tool before sufficient axial load is applied to the fastener as in the case of a self tapping screw. In the case of automated operation in a fixture, the push to start can be used as a form of presence detection.

During the time the rotary tool 10 is driving the fastener (either by the push to start mode or by depressing the lever 20), the magnitude of the torque delivered to the fastener by the rotary tool 10 is measured by the at least one strain gage 85 disposed within the flexure 25. The strain gage bridge produces an analog output that is continuously monitored during tool operation. The strain gages should be arranged in such a fashion as to be only sensitive to torsion along the axis of the flexure 25. Each strain gage 85 has two elements that are oriented 90 degrees to each other and 45 degrees to the axis of the flexure 25. There are four gages arrayed around the circumference of the flexure in 90° intervals. Under torsion the strain gages 85 will unbalance the Wheatstone bridge therefore producing an output. Under bending, compression, or tension the loads will cancel therefore maintaining a balanced bridge and producing little or no output. The torque value measured by the at least one strain gage 85 is uploaded to the controller 80 as the controller 80 interrogates data from the rotary tool 10. Thus, a real time measurement of the torque applied to the fastener can be obtained by the controller 80 through its constant monitoring of the at least one strain gage 85. Further, the controller 80 can be programmed to instantaneously deactivate the rotary tool 10 when the torque measured by the at least one strain gage 85 matches the shut off torque stored in the controller 80. More specifically, when the torque as measured by the strain gate 85 controller 80 combination reaches the preselected torque, the controller 80 immediately and actively stops rotation of the tool, thus ensuring that the fastener being secured by the tool is not over tightened. The braking or stopping of the tool is accomplished through the use of plug reversing and dynamic braking. Plug reversing involves applying full reverse power to the motor 36 until the strain gage 85 and controller 80 senses zero torque. Dynamic braking takes advantage of the fact that a motor 36 is also a generator. By shorting the power leads of the motor 36 to each other, the effect is to force the motor 36 to resist its own rotation in proportion to its rotational velocity. Therefore, one of the many advantages realized by the present invention is the ability to precisely tighten fasteners exactly to a desired torque without the danger of over or undertightening a fastener. This advantage is due in part to the real time monitoring of torque and the instantaneous response of the controller 80 actively deactivating the rotary tool 10.

The controller can be programmed with a target torque and speed. Optionally the controller can be set to run the rotary tool 10 at two different speeds. The first speed would be relatively high and would run until a selected torque, which is not the target torque, is reached. The second, or downshift speed, would run slower and then stop at the target torque. For example if the target torque is 20 in-lbs the controller may be set as follows: Initial speed of 1000 rpm until a down shift torque of 12 in-lbs is reached. Then a down shift speed of 250 rpm until the target torque is reached. Additionally, angle measurement and control can be implemented. Angle control can either be substituted for torque or used in combination with torque. An AND relationship can be established with torque and angle. By setting a torque target of 20 in-lbs and an angle target of 60°, both targets have to be met or exceeded in order to count as a successfully fastened joint. The angle count is started at a threshold torque of perhaps 10 to 20 percent of the target torque. In this case that would be 2 to 4 in-lbs. Other parameters can be set to form upper and lower torque and angle limits around the targets. For example with a 20 in-lb target the limits may include a torque low limit of 18 in-lbs and a high limit of 22 in-lbs with an angle low limit of 50° with an angle high limit of 70°. These limits are used to form a window around the target for the purposes of establishing the criteria for a properly torqued fastener. If the angle is to low before achieving the target torque then the fastener has likely cross threaded. If the angle is to high then the fastener has likely stripped, broken or was not present.

In a preferred embodiment, the dimensions of the present invention enable it to be used by an operator with a single hand thus being a hand held device. Accordingly the dimensions of the rotary tool 10 should be in the range of from 7–9 inches in length and from about 1–2 inches in diameter.

EXAMPLE

In an exemplary embodiment of the present invention the motor 36 is coupled to a gear box 38 comprised of two gear stages, where the two stages provide a conversion of speed to torque. To maximize torque/velocity conversion while minimizing space, the preferred gear system is a planetary gear system. In this system the first stage sun gear is attached to the motor output shaft and engages a series of three planetary gears. The planetary gears are all attached to a planet carrier, from which extends a second sun gear into the next planetary gear stage. The output shaft of the second gear stage, which has a spline gear formed thereon, mates with the output drive. It is preferred that the gearboxes be in a sealed oil gearbox. Sealing the gearbox eliminates gear maintenance, helps keep the gears clean, and protects the gears from foreign matter. The light oil in lieu of a more viscous lubricant, such as grease, greatly enhances the efficiency of torque transmission. The preferred lubrication for this configuration provides a balance of good high-pressure lubricity, low viscosity as compared to conventional power tool greases, and enough tackiness to require only 1 milliliter of oil therefore greatly reducing viscous shear.

With regard to the field device 34 disposed on the shaft 29, in the preferred embodiment the field device 34 is a ring magnet that is plastic injection molded using permanent magnet particles suspended in Nylon. This configuration provides relatively high field density combined with low cost. Further, the ring magnet should be radially magnetized, the outer diameter of the ring magnet is magnetized as a north pole and the inner diameter is oppositely polarized as entirely all south pole. However, the inner ring could be magnetized as all north pole and the outer diameter could be magnetized as all south pole. This is done so that the output of the Hall sensor within the chuck assembly VVD 73 stays consistent regardless of the rotational orientation of the shaft 29. It is preferred that the Hall output vary as a result of axial movement only. If the ring magnet were magnetized with alternating poles on the outside diameter, the chuck assembly 28 would stop rotating as the poles reversed. All the gears are made from medium-carbon steel selected because of its hardness and heat-treating properties. Medium-carbon steel is also used in the planet carriers. The gear axles are made from a high-carbon steel that is a high strength gear material with excellent bending fatigue properties.

Some of the advantages realized by the present invention include a high degree of reliability and durability. The operating limit of many fastening tools before failure is about 500,000 cycles, in fact tools that are capable of operating up to 1,000,000 cycles without failure are considered very durable. In contrast the present invention has been found to operate in excess of 5,000,000 cycles without failure, which greatly exceeds the durability expectations of such a tool. Further, the present invention is also capable of this high number of cycles when subjected to high duty cycle applications. That is when an operating process is being repeated very quickly with many cycles per hour. Additionally, the performance of a gear box 38 produced in accordance with the specifications of this application is superior to many other gear boxes used for similar applications. For example, similar type gear boxes generally have a maximum operation rotational speed at up to 7000–8000 revolutions per minute (rpm), whereas the gear box 38 of the present invention is capable of rotational speeds up to 50,000 rpm.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, the push to start feature can be physically disabled. Also, all four torque capacities can optionally be available in fixture mount configurations. A different front end cap is supplied with the tool to allow for easier and more reliable mounting of the tool in fixtured applications. Instead of a tapered end cap with headlights, a threaded end cap with a shoulder is provided including two different styles of mounting flanges. The fixture mounted configuration allows for the minimization of center to center mounting distances. In effect the tools can be mounted on 1.125" centers 1.125" is the diameter of the tool. This is important when fasteners are located very close to each other. This is of primary concern in automated applications where there is no human interaction or when multiple tools are mounted in combination with each other in a hand operated power head. Further, the variable voltage device can be any device that responds to some external stimulus, such as voltage, current, pressure, or magnetic, or that switches at a threshold of stimulus. The variable voltage device can be selected from items such as a linear response device, or a digital response device.

These and other similar modifications will readily suggest themselves to those skilled in the art, and are intended to be encompassed within the spirit of the present invention disclosed herein and the scope of the appended claims.

What is claimed is:

1. A rotary tool comprising:

a motor capable of providing a rotational force; an actuator for activating said motor;

a chuck assembly operatively connectable to said motor; and a variable voltage device responsive to a magnetic field, wherein said motor is in operative communication with said variable voltage device wherein selectively moving the chuck assembly varies the magnitude of the magnetic field applied to the variable voltage device and proportionally varies the power supplied to said motor and thereby variably alters the corresponding rotational speed of the chuck assembly.

2. The rotary tool of claim 1, wherein said variable voltage device is a Hall effect transformer.

3. The rotary tool of claim 1, further comprising a field device provided on said chuck assembly capable of emitting a magnetic field.

4. The rotary tool of claim 3, wherein positioning said field device by selective movement of said chuck assembly controllably drives said motor, whereby positioning said field device manipulates the magnitude of the magnetic field subjected to said variable voltage device emanating from said field device.

5. The rotary tool of claim 4, wherein the magnitude of the magnetic field proportionally relates to the proximity of the variable voltage device in relation to the field device.

6. The rotary tool of claim 1 further comprising a lever assembly having a field device formed thereon capable of emitting a magnetic field.

7. The rotary tool of claim 6 wherein positioning said field device by selective movement of said lever assembly controllably drives said motor, whereby positioning said field device manipulates the magnitude of the magnetic field subjected to said variable voltage device emanating from said field device.

8. The rotary tool of claim 7, wherein the magnitude of the magnetic field proportionally relates to the proximity of the variable voltage device in relation to the field device.

9. The rotary tool of claim 1, further comprising a torque transducer capable of measuring the value of the torque generated by said chuck assembly.

10. The rotary tool of claim 9 further comprising at least one strain gauge in cooperative engagement with said torque transducer.

11. The rotary tool of claim 10, wherein said at least one strain gauge transmits data representing the torque generated by said chuck assembly usable to terminate operation of said driver when the torque generated by said chuck assembly reaches a predetermined amount.

12. The rotary tool of claim 1 further comprising a first selector switch programmably capable of selectively reversing the polarity of the electrical power supplied to said driver.

13. The rotary tool of claim 1 further comprising a second selector switch programmably capable of selectively operating said driver in a different control mode.

14. A system to drive fasteners comprising a rotary tool combinable with a controller assembly:

said rotary tool comprising, a motor capable of providing a rotational force, an actuator for activating said motor, a chuck assembly operatively connectable to said motor, and a variable voltage device responsive to a magnetic field, wherein said motor is in operative communication with said variable voltage device wherein selectively moving the chuck assembly varies the magnitude of the magnetic field applied to the variable voltage device and proportionally varies the power supplied to said motor and thereby variably alters the corresponding rotational speed of the chuck assembly;

said controller assembly capable of providing control instructions to said rotary tool, said control instructions comprising maximum torque magnitude, operational speed.

15. A rotary tool useful for driving fasteners comprising:

a motor operatively connectable with a variable voltage power source; an actuator for activating said motor;

a means for creating a magnetic field, wherein said magnetic field can be applied to the variable power source;

a chuck assembly capable of coupling said fastener device with a fastener; and a transducer comprising a strain gage coupled with a flexure capable of monitoring the magnitude of the torque applied to the fastener by said fastener device wherein selectively moving the chuck assembly varies the magnitude of the magnetic field applied to the variable voltage power source and proportionally varies the power supplied to said motor and thereby variably alters the corresponding rotational speed of the chuck assembly.

16. The rotary tool of claim 15 wherein said transducer comprises at least one strain gage.

17. The rotary tool of claim 16 further comprising a flexure combined with said at least one strain gage.

18. The rotary tool of claim 15, wherein said fastener device is hand held.

19. The rotary tool of claim 15, wherein said transducer provides real time feed back information of the magnitude torque of the torque applied to the fastener by said fastener device.

20. The rotary tool of claim 19, wherein said transducer provides said real time feed back information to a controller that is communicates with said rotary tool.

21. The rotary tool of claim 15, wherein said fastener device is capable of accurately applying a magnitude of torque to a fastener that ranges from about 1 in-pounds to about 50 in-pounds.

22. The rotary tool of claim 15, wherein said rotary tool is capable of accurately applying a magnitude of torque to a fastener of about 20 in-pounds.

* * * * *